L. B. SPERRY.
STEERING DEVICE FOR AIRCRAFT.
APPLICATION FILED MAR. 24, 1915.

1,390,653. Patented Sept. 13, 1921.

WITNESSES:
Rurt A. O. Schacht
Jn° C. B. Richards

INVENTOR.
Lawrence B. Sperry
BY Herbert H. Thompson
ATTORNEY.

UNITED STATES PATENT OFFICE.

LAWRENCE B. SPERRY, OF BROOKLYN, NEW YORK, ASSIGNOR TO THE SPERRY GYROSCOPE COMPANY, OF BROOKLYN, NEW YORK, A CORPORATION OF NEW YORK.

STEERING DEVICE FOR AIRCRAFT.

1,390,653.   Specification of Letters Patent.   Patented Sept. 13, 1921.

Application filed March 24, 1915. Serial No. 16,721.

*To all whom it may concern:*

Be it known that LAWRENCE B. SPERRY, a citizen of the United States of America, residing at Brooklyn, New York, has invented new and useful Improvements in Steering Devices for Aircraft, of which the following is a specification.

My invention relates to navigational instruments for air craft such as aeroplanes and dirigible balloons. The object of the invention is to devise an instrument whereby the aviator may not only detect the side drift of the air craft and thereby determine the true direction in which he is heading, but also an instrument whereby he may accurately determine the actual direction in which he must point the machine in order to fly upon a predetermined course. While I am aware that instruments have been devised to show the aviator when he is being carried off his course, I believe that I am the first to construct an apparatus which will automatically indicate to the pilot of the machine the true direction in which he must head the machine in order to keep upon the course.

Another object of the invention is to improve upon the construction of compasses in general. Other objects will appear as the description proceeds.

Figure 1:
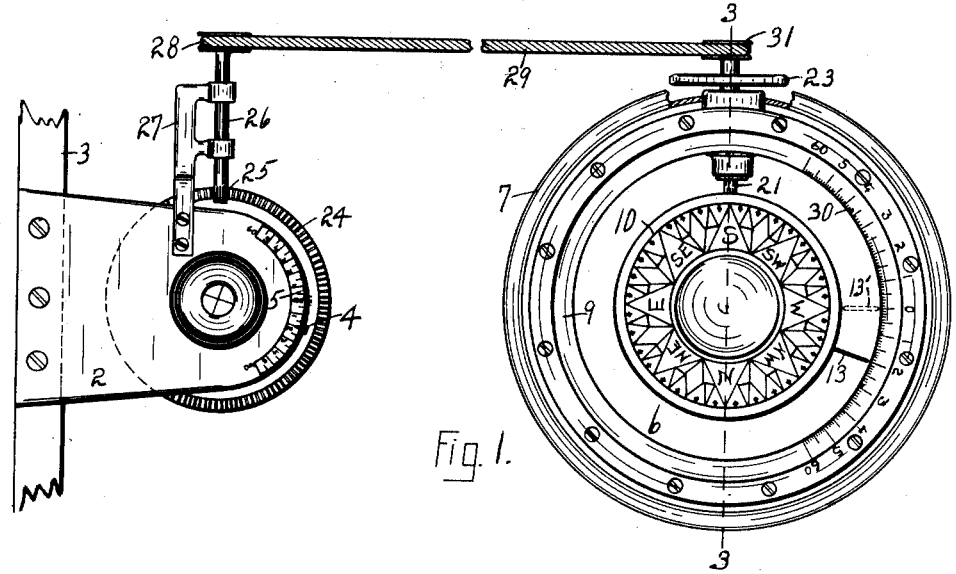
Figures 2, 3:
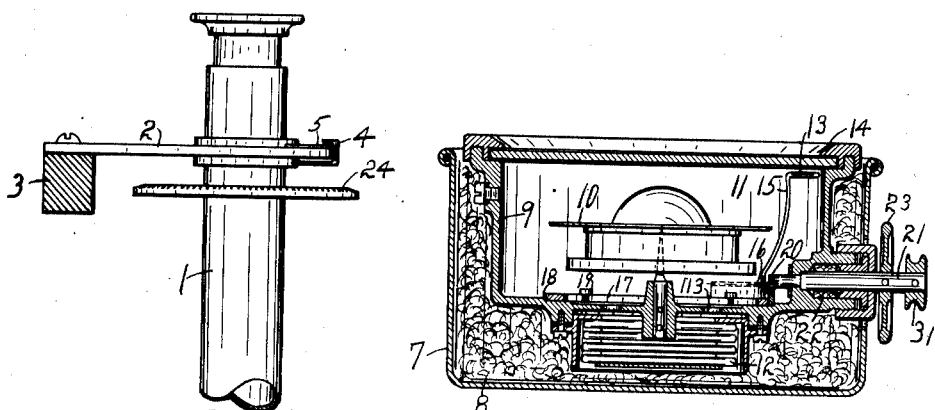
Figure 4:
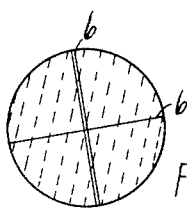
Figure 6:
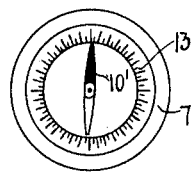
Figure 5:
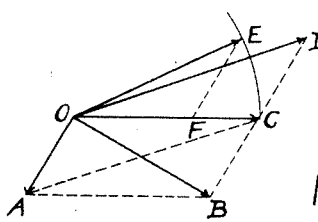

Referring to the drawings in which is illustrated what I now consider to be the preferred form of my invention; Figure 1 illustrates a plan view of my navigational apparatus. Fig. 2 is a side elevation of the portion thereof which I term the drift machine or object focusing device. Fig. 3 is a section on line 3—3 of Fig. 1 showing the internal construction of the compass. Fig. 4 is a diagrammatic representation of the image seen through the object focusing device. Fig. 5 is a diagram illustrating the problem presented in steering air craft in windy weather. Fig. 6 is a modification.

Referring to Fig. 5, let OC represent the velocity of the flight through the air and also the actual direction in which the aviator desires to fly, and let OA represent the velocity of the wind. Then the actual velocity of the aeroplane will be the resultant OB of the parallelogram constructed on OA and OC and the angle COB will be the angle of drift.

At first glance it might appear that all the aviator need do in order to steer on course OC is to turn the machine back through the angle BOC, but this is not true in general. The simplest method of determining graphically the direction in which he must head the machine in order to steer on course OC is to construct a parallelogram on OA as one side and OC as the resultant (C A O D). We have then OD as the indicated velocity and <COD the angle of heading, which, it will be seen, is not necessarily equal to <COB. Also it should be observed that the indicated velocity OD has been increased, so that <COB is only correct if the speed of the aeroplane is changed. If this speed is not changed we have to determine another line OE such that OE=OC and EF=CD resulting in a different angle COE. So that it will be apparent that by present methods, accurate results may be obtained only by many and repeated observations.

By means of my invention, I overcome these difficulties and render unnecessary repeated observations, by enabling the aviator to bring his machine directly around to the true course in one operation.

More particularly my invention includes an object focusing or image producing device 1 of any suitable nature, such as an ordinary telescope or a device which produces a real image upon a screen after the manner of a camera obscura. This device which I term for convenience a sighting means may be mouted in any suitable position upon the machine as by a bracket 2 secured to a portion of the machine 3. The sighting tube proper is rotatably mounted on the bracket 2, so that it may be turned upon its vertical axis. A pointer 4 may be secured to the sighting tube so as to be readable upon a scale 5 upon the bracket 2 whereby the angle through which the sighting tube is turned may be indicated to the observer. Means are provided within this sighting tube 1 to indicate to the observer the angle at which the aeroplane is moving with respect to the position of the pointer 4. Preferably this means consists of cross hairs 6, 6', at least one of which extends normally in the direction of the fore and aft line of the aeroplane. Preferably a plurality of hairs extend in this direction so that the observer may readily distinguish which cross hairs extend in line with the pointer. The observer then on looking through the sighting device may readily ascertain whether or not the machine is drifting sidewise by the stream lines of the objects on the earth passing across the field of vision, and he may readily ascertain the true direction of flight by turning the hairs 6 so that they lie exactly parallel to these stream lines. The scale 5 will then show the angle of side drift of the aeroplane.

My drift indicator, as above described, is similar to the one disclosed and claimed in U. S. Letters Patent No. 1,274,622, dated August 6th, 1918, and assigned to the assignee of the present application.

Operatively connected with the drift machine is a compass 6 preferably of the magnetic type. Said compass may be mounted within a casing 7, which contains packing 8 so as to prevent shocks and jars from reaching the delicate parts of the compass. The compass comprises the usual bowl or casing 9, and compass rose or needle 10 or 10', the entire casing being filled with a liquid 11. In order to provide for expansion and contraction of the liquid and to prevent damage to the casing therefrom, I may secure to the bottom of the casing an expansible corrugated member 12 which is in communication with the interior of the casing by opening 113, and is consequently also filled with the liquid 11. It will readily be seen that any expansion or contraction of the liquid will be taken care of by this flexible attachment, thus relieving the casing of any undue strains and avoiding the possibility of air leakage.

The reference member 13, instead of being fixed adjacent the magnetic element is adjustably mounted within the casing 9.

In the form shown in Fig. 1, this member is in the form of an index pointer 15, which is normally in line with the fore and aft or lubbers line of the aeroplane, so that the aviator may determine the direction in which the machine is heading. The said pointer extends up from a rotatably mounted gear sector 16. It is obvious where a compass needle 10' is employed instead of a compass rose that the reference member employed may be made in the form of a circular lubber's scale 13'' as shown in Fig. 6. Said sector 16 may be secured to a ring 17 rotatably mounted upon the bottom of casing as between the small flange 18 and pins 19. Rotation is imparted to the sector by means of a pinion 20 on the end of a shaft 21 which extends without the casing through packing box 22. A handwheel 23 may be mounted on shaft 21 so that it may readily be adjusted to turn the index 13 to the proper position. Any suitable form of connection may be used to communicate the rotation of the object focusing device 1 to the index 13. As shown, this comprises a bevel gear 24 mounted on the sighting piece 1 and a pinion 25 meshing with said bevel gear and mounted upon or made a part of a shaft 26. Said shaft is rotatably mounted in a bracket 27 extending from bracket 2 and carries a pulley 28. A flexible wire or rope 29 may be used to connect pulley 28 with a similar pulley 31 on shaft 21. In addition to the shiftable lubber's line index 13 I may provide the compass with a fixed lubber's scale 30 which will not only serve to show at all times the actual direction in which the air craft is pointed when read in connection with the compass rose but will also show the angle through which the shiftable lubber's index has been moved away from its normal position. The operation of my device is a follows:

Suppose that an aviator desires to fly due west and that he heads his machine so that the lubber's line index, when in the normal position 13', or the fixed scale 30 indicates that he is heading his machine due west but if any wind is blowing, as is well known, the machine will not take a true westerly course but will head in a direction which is the resultant of the velocity and heading of the aeroplane and the velocity and direction of the wind. In order then to fly due west the observer on the aeroplane makes observations through the drift machine or object focusing device and turns it so as to indicate the true direction in which the aeroplane is moving. The cross hairs 6 enable this to be done with great accuracy. As he turns his machine it will be seen that the index 13 is automatically shifted to correspond so that the compass will then indicate to the pilot that his machine is not flying in the direction desired and will apparently show that he is pointing it off the desired course. The pilot will then of course start to adjust the rudder so as to bring the index 13 back to the due west position. While it might appear that all the pilot would have to do would be to turn the machine through an angle equal to the angle through which index 13 has been turned as shown on scale 30, this is not strictly true for the reasons explained in connection with Fig. 5. While the pilot is bringing the machine around so that the compass will again show that he is heading west, the observer maintains the cross hairs 6 parallel to true heading, so that the machine is actually flying due west when the movable index indicates that fact and no further adjustment is required.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A course indicator for air craft comprising a base, downwardly directed sight means adjustably mounted on said base and adapted to be turned in a predetermined relation to the true course of the air craft, a compass including a movable reference member, and connections between said means and said member to move the latter.

2. A course indicator for air craft comprising an object sighting means for observing the ground below, a line in the field of vision of said means, a compass, means whereby said sighting means may be adjusted so that said line may be brought into coincidence with the line of flight of the craft, and means connected for movement by said sighting means to effect a change in the apparent readings of the compass.

3. A steering device for aircraft or other vehicle comprising a compass bowl, a compass rose therein, a movable member bearing a lubber's line index adjacent said rose, a fixed member on said bowl bearing a scale adjacent said member and means movable into relationship with the actual direction of travel of said craft for moving said index off the fore and aft line of the craft whereby said device shows to the observer that he has apparently turned off his course and the magnitude of such deviation.

4. A steering device for aircraft or other dirigible vehicle comprising a compass bowl, an element adapted to assume a fixed position in azimuth rotatably mounted therein, a reference member movably mounted therein adjacent said element, means extending without the bowl for turning said member within the bowl to correct for side drift, and means for ascertaining the direction of flight of the craft associated with said turning means for controlling the same.

5. A drift indicator for aircraft comprising a telescope mounted with its sighting axis on a normally vertical position, a light intercepting mark in the field of vision of said telescope, means rotating said telescope whereby said mark may be brought into coincidence with the line of flight of the air craft, and means controlled by the rotation of the telescope for indicating the angle between said mark in the telescope and the lubber line of said aircraft.

6. In combination, a base, a sighting device mounted on said base, said device having means for indicating its relationship with the stream lines visible therethrough and rotatable about its sighting axis, a compass comprising a plurality of indicating elements, and means connecting said sighting device to one of said indicating elements to move the same as said device is moved.

In testimony whereof, I have signed my name to this specification in the presence of two subscribing witnesses, this 22nd day of March, 1915.

LAWRENCE B. SPERRY.

Witnesses:
D. C. GOODMAN,
EDWIN W. DAY.